FIG_1a
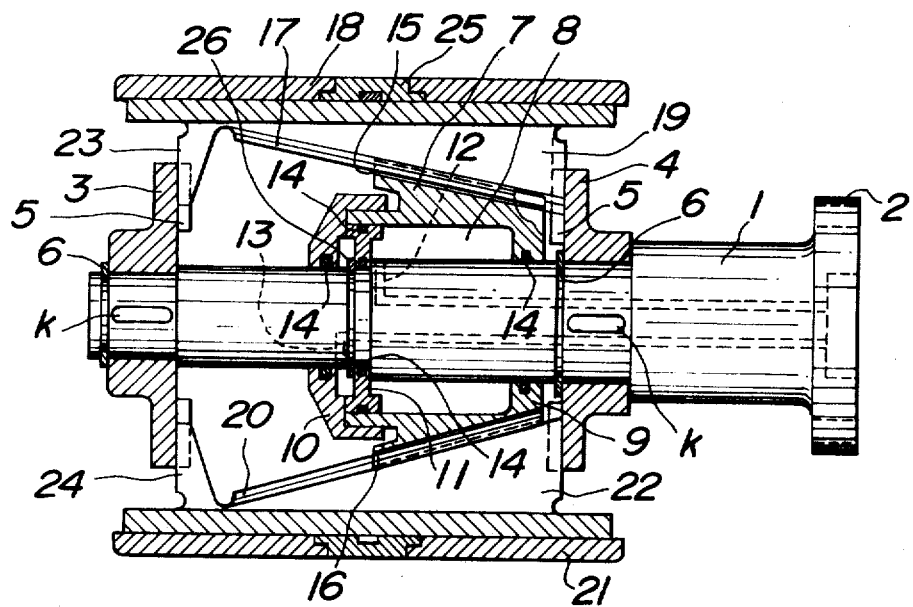
FIG_1b
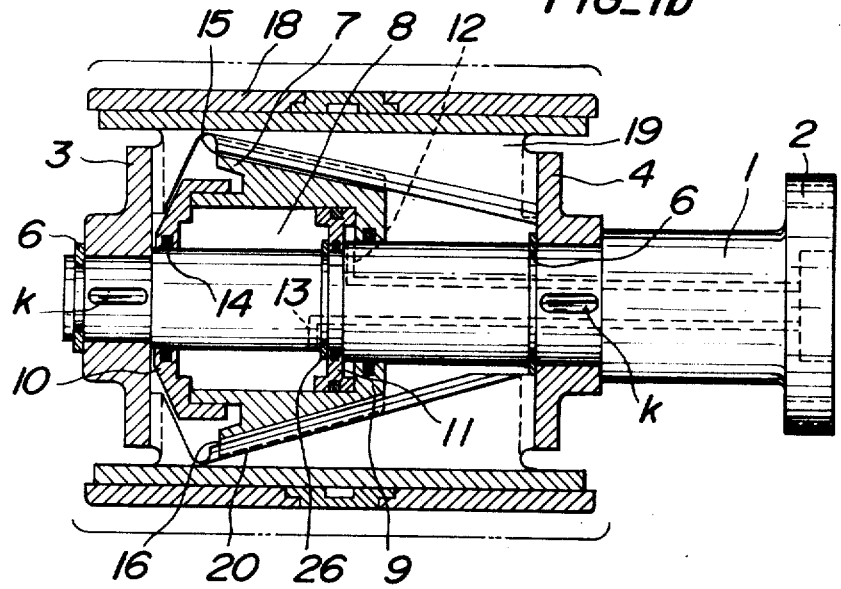

FIG_2a
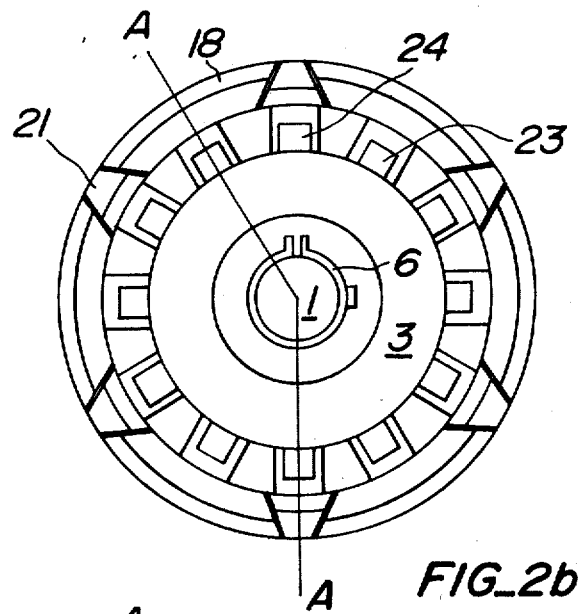
FIG_2b
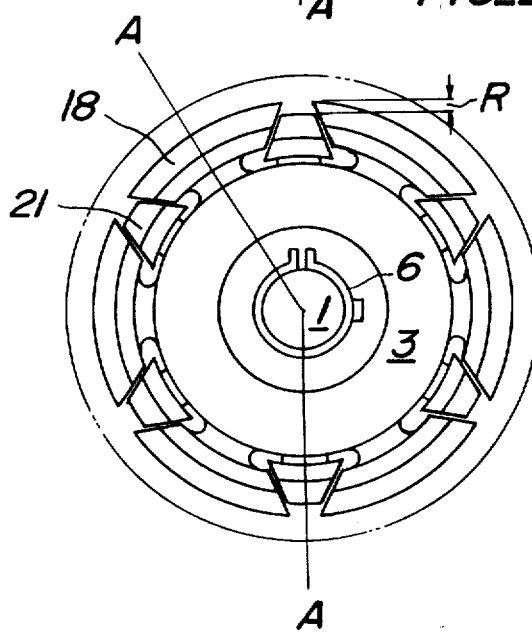

FIG_3
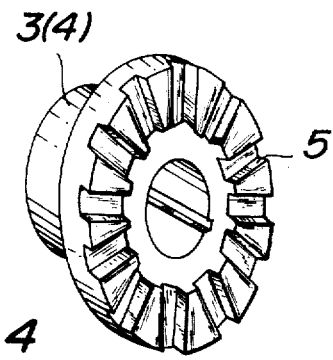
FIG_4
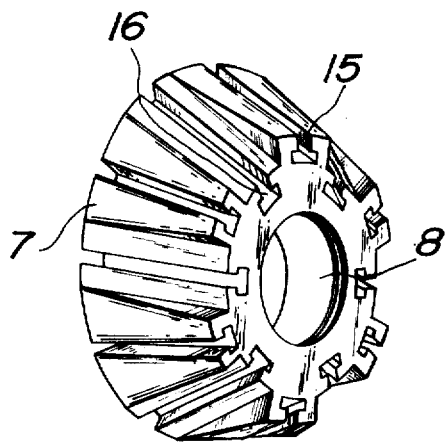
FIG_5
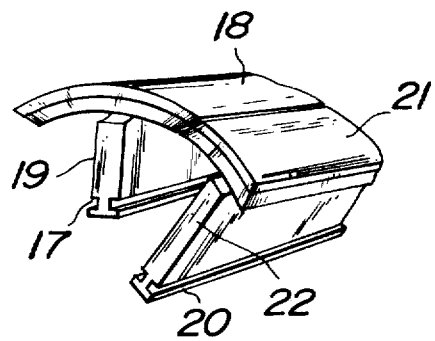

3,817,812
DRUM FOR BUILDING GREEN TIRES
Toshinori Yabe, Tokyo, Japan, assignor to Bridgestone Tire Company Limited, Tokyo, Japan
Filed May 2, 1972, Ser. No. 249,557
Claims priority, application Japan, May 11, 1971, 46/30,831
Int. Cl. B29h 17/16
U.S. Cl. 156—415    2 Claims

ABSTRACT OF THE DISCLOSURE

A drum for building green tires is provided whereby various kinds of green cases having different diameters may be built by a mere replacement of segments in a simple and rapid manner. The replacement of segments is simplified by providing a sliding ridge-groove connection between the segments and a wedge-like cylinder. The wedge-like cylinder is reciprocated by a pressure fluid to expand and contract the segments.

---

This invention relates to a drum for building green tires and adapted for use in assembling the green tire or a green case to be built prior to the formation and vulcanization of a pneumatic tire.

It is necessary not only for the outer diameter of such kind of drum to be made of a desired dimension and truly circle in case of building the green case, but also for the green case which has been built to be deformed minimally in case of removing it from the drum. Thus, the drum must be reduced in its diameter for the purpose of easily removing the green case therefrom.

Many mechanisms for expanding and contracting the diameter of the drum have been proposed, but hitherto none has led to fully satisfactory results. The conventional mechanisms are complex in construction and make it difficult to obtain an accurate drum surface even after the drum has been machined in an extremely accurate manner.

For example, provision has been made of a mechanism for expanding and contracting the diameter of a drum, which comprises large and small segments and in which these segments are caused to move in response to the movement of a pair of cams disposed on a driving shaft and spaced one from the other.

Such conventional mechanism has a number of disadvantages. In the first place, the drum is crammed in its narrow inner space with control members such that means for driving the pair of cams could not be incorporated therein and the pair of cams and the cam following members must be produced by a high degree of accurate machining which together with the complex construction thereof render it unsatisfactory to make the surface of the drum accurate and to maintain such accurate surface. Secondly, the movement of the large and small segments in the diameter expanding direction is restricted by an expansible endless belt so that provision must be made of a strong band in order to reliably reduce the diameter of the drum which has to be operated by a strong power with the result that there is risk of the members being worn by friction. Thirdly, when the centrifugal force acting upon each segment by the step of winding the ply under the reduced diameter condition prior to the insertion of the bead rings exceeds the restraining force urged by the band, it becomes impossible to maintain the continuous surface of the band. Finally, each segment which is made integral with the cam following means permits the drum to be used for the building of a green case of a given size only and could not be applied to the building of various kinds of green cases whose diameters are different.

One of the prime objects of the invention is to provide a drum for building green tires wherein a drum expanding and contracting mechanism is so simplified that segments can be mounted so as to form a drum in a simple and detachable manner.

A further object of the invention is to provide a drum for building green tires which is capable of forming an accurate drum surface adapted for use in building various kinds of green cases having different diameters by a mere replacement of segments in a simple and rapid manner.

Additional objects of the invention together with the features contributing thereto and the advantages accruing therefrom will be apparent from the following description when read in conjunction with the drawings, wherein:

FIG. 1a is a section on line A—A of FIG. 2a showing one embodiment of a green tire building drum according to the invention with the segments expanded;

FIG. 1b is a section on line A—A of FIG. 2b similar to FIG. 1a but showing the segments in their contracted position;

FIG. 2a is an end view of FIG. 1a;

FIG. 2b is an end view of FIG. 1b;

FIG. 3 is a perspective view showing a flange;

FIG. 4 is a perspective view showing a wedge-like cylinder; and

FIG. 5 is a perspective view showing first large and second small segments, respectively.

In FIGS. 1a, 1b and 2a, 2b, numeral 1 designates a driving shaft to which is transmitted power from a flange coupling 2 is rotatably driven during the steps of building green cases. To the driving shaft 1 are secured a pair of flanges 3, 4 by means of keys K, the flanges 3, 4 being axially spaced apart each other.

The flanges 3, 4 are provided at their opposite faces with even number of radially extending guide grooves 5 and are tightly clamped on the driving shaft 1 with the aid of, for instance, a snap ring 6, respectively.

Between the flanges 3, 4 is arranged a wedge-like cylinder 7 which is slidably mounted around the driving shaft 1 and adapted to be moved in the axial direction along the driving shaft 1.

The wedge-like cylinder 7 is provided at its ends with an end wall 9 and end cover 10, respectively, between which and the driving shaft 1 is formed an annular chamber 8.

To the driving shaft 1 is secured by means of, for example, a snap ring 26 a fixed piston 11 adapted to divide the annular chamber 8 into two right and left halves which are connected through ducts 12, 13 extending through the driving shaft 1 to a fluid supply source (not shown), respectively. 14 designates an O-ring for hermetically sealing the annular chamber 8. Supply of the fluid under pressure from one of the ducts 12, 13 and exhaust it out of the other duct causes the wedge-like cylinder 7 to reciprocate along the driving shaft 1.

The wedge-like cylinder 7 is of such pyramidal form that it is provided at its outer periphery with dovetail grooves 15, 16 which are inclined away from the end facing the end cover 10 and at angles different alternately one from the other, the dovetail grooves 15 being gently inclined while the dovetail grooves 16 being steeply inclined, as shown in FIG. 4.

The surface of a drum is formed by a number of first large segments 18 and second small segments 21. Each of the first large segments 18 is provided at the lower edge of its web 19 with a dovetail ridge 17 adapted to be closely but slidably engaged with the gently inclined dovetail groove 15 on the one hand and each of the second small segments 21 is provided at the lower edge of its web 22 with a dovetail ridge 20 adapted to be closely but slidably engaged with the steeply inclined dovetail groove 16 on the other hand, as shown in FIG. 5.

Each of the segments 18, 21 is provided at its both ends with projections 23, 24, respectively, adapted to be engaged with each of the radially extending grooves 5 of the flange 3. 25 designates a spacer adapted to change the length of the drum.

The operation of the drum shown in FIGS. 1a, 1b is as follows. When the drum is in the position shown in FIG. 1a and the fluid is supplied under pressure from the supply source (not shown) through the conduit 13 into the left half portion of the annular chamber 8 and the fluid in the right half portion of the annular chamber 8 is exhausted through the conduit 12 to the exterior of the drum, the wedge-like cylinder 7 is moved from the position shown in FIG. 1a towards the position shown in FIG. 1b. Thus, the segments 18, 21 are caused to be slidably contracted in their diameters by the sliding ridge-groove connections between the dovetail ridges 17, 20 and the dovetail grooves 15, 16 and by the slidable inwards movement along the radially extending grooves 5 of the flanges 3, 4.

When the wedge-like cylinder 7 arrives at the position shown in FIGS. 1b and 2b, the steeply inclined grooves 16 cause the second small segments 21 to lead the first large segments 18 in engagement with the gently inclined grooves 15 by a distance R (FIG. 2b) in the radial direction thus contracting the diameter of the surface of the drum shown in FIG. 2a to that shown in FIG. 2b.

Conversely, if the fluid is applied under pressure from the supply source (not shown) through the conduit 12 into the right half portion of the annular chamber 8 and the fluid in the left half portion of the annular chamber 8 is exhausted through the conduit 13 to the exterior of the drum, the wedge-like cylinder 7 is moved from the position shown in FIG. 1b towards the position shown in FIG. 1a. Thus, the segments 18, 21 are caused to be slidably expanded in their diameters. During this expanding movement of the wedge-like cylinder 7 from the position shown in FIG. 1b to the position shown in FIG. 1a, the gently inclined dovetail grooves 15 cause the first large segments 18 to move slowly with respect to the movement of the second small segments 21 so as to bring each adjacent side edges of the segments 18, 21 into contact, with the result that the outer peripheral surface of all of the segments 18, 21 is formed into an accurate continuous cylindrical surface which can be used as the surface of a drum for building a correct green tire.

As explained hereinbefore, the invention provides an easy and simple way of assembling and disassembling the drum, the disassembling being performed by first removing the flange 3 and then extracting the first large segments 18 and the second small segments 21 in succession in the order mentioned, and can be applied effectively to the fabrication of various kinds of green tires having different diameters by replacing and disassembled segments for a combination of another first and second segments prepared beforehand.

As described in the foregoing, the drum for building green tires of the invention is simple in construction and the assembling and disassembling thereof can very easily be performed without abrading the green tires and segments. Moreover, with the drum for building green tires of the invention, the movements of expanding and contracting the diameter of the drum can reliably be guided with ease and the replacement of the segments ensures an easy and simple manufacture of various green tires having different diameters with the aid of a single drum. Therefore, the invention contributes greatly to the industry.

What is claimed is:

1. A drum for building a green tire comprising a driving shaft, a pair of flanges secured to said driving shaft and axially spaced apart from each other, said flanges being provided at their opposed faces with a number of radially extending guide grooves, a wedge-like cylinder slidably mounted around said driving shaft and having at its outer periphery grooves extending axially and inclined at angles different alternately one from the other, said wedge-like cylinder being provided therein with an annular chamber which is divided by a fixed piston into two halves each connected through a duct to a fluid supply source, first and second segments disposed alternately around said wedge-like cylinder and adapted to form a continuous surface of the drum when expanded and to reduce the diameter of the drum when contracted, each of said first segments having at its inner edge a ridge adapted to engage one of the less inclined grooves of said wedge-like cylinder and having at both of its ends projections adapted to engage the radially extending guide grooves of said flanges, and each of said second segments having at its inner edge a ridge adapted to engage one of the more inclined grooves of said wedge-like cylinder and having at both of its ends projections adapted to engage the radially extending guide grooves of said flanges, and means including said fixed piston for reciprocating said wedge-shaped cylinder along said driving shaft between said pair of flanges so as to expand and contract said first and second segments.

2. A drum for building a green tire as claimed in claim 1 wherein the width of said first segment is made wider than that of said second segment and each of said first and second segments is provided at the center of its lower surface with a web projecting radially and provided at its lower edge with a dovetail ridge.

References Cited
UNITED STATES PATENTS

| | | | |
|---|---|---|---|
| 3,178,331 | 4/1965 | Bishop et al. | 156—415 |
| 2,715,933 | 8/1955 | Frazier | 156—415 |
| 3,207,648 | 9/1965 | Shilts | 156—415 |
| 3,237,199 | 2/1966 | Brey | 156—415 |
| 3,322,599 | 5/1967 | Bishop | 156—417 |
| 1,860,342 | 5/1932 | Heston | 156—415 |
| 1,869,656 | 8/1932 | Black | 156—415 |

CLIFTON B. COSBY, Primary Examiner

U.S. Cl. X.R.

156—417